March 16, 1965 J. W. HALTERMAN 3,173,450
GASKET SUPPORT FOR PIPE REPAIR CLAMP
Filed Jan. 22, 1962 2 Sheets-Sheet 1

INVENTOR.
JAMES W. HALTERMAN

March 16, 1965   J. W. HALTERMAN   3,173,450
GASKET SUPPORT FOR PIPE REPAIR CLAMP
Filed Jan. 22, 1962   2 Sheets-Sheet 2

INVENTOR.
JAMES W. HALTERMAN
BY

ATTORNEY.

United States Patent Office 3,173,450
Patented Mar. 16, 1965

3,173,450
GASKET SUPPORT FOR PIPE REPAIR CLAMP
James W. Halterman, Salamanca, N.Y., assignor to Dresser Industries, Inc., Dallas, Tex., a corporation of Delaware
Filed Jan. 22, 1962, Ser. No. 168,325
1 Claim. (Cl. 138—99)

The present invention relates to pipe repair clamps and is concerned primarily with the provision of a reinforcement or support for the gasket which is an essential part of such a clamp.

At the present time, pipe repair clamps are meeting with widespread use, particularly in the water works industry. A pipe repair clamp of the character with which this invention is concerned includes a flexible band or split sleeve that encircles the pipe and the ends of which are anchored to lugs with the lugs being drawn together by bolt and nut assemblies. A gasket is carried by the inner face of the band and is compressed about the pipe as the ends of the band are drawn together by the bolts.

In some instances it has been the practice to cement the gasket to the band throughout the entire engaging areas. However, it has been proposed to utilize a bond between only a small portion of these engaging areas leaving the major part of the gasket free to move relative to the band. An example of such an arrangement is fully disclosed in the copending application of Risley et al., Serial No. 50,253, filed August 17, 1960, for "Pipe Repair Clamp."

From the very nature of its intended purpose, the gasket overlies a break in this pipe. Should such a break be located at the meeting ends of the gasket there is a grave tendency for the end of the gasket to fall down or collapse into the break because heretofore there has been nothing at the break to properly support the gasket in position.

With the foregoing conditions in mind this invention has in view as its foremost objective the provision of a pipe repair clamp which includes gasket reinforcing or supporting means at the meeting ends of the gasket and which supporting means functions to properly maintain the gasket in position.

More in detail, the invention has as an object the provision of gasket reinforcing and supporting means of the character aforesaid which is carried by the gasket itself. It consists essentially of a rigid plate or sheet such as sheet metal which is carried by one gasket end. In one form of the invention the supporting plate is embedded in a shallow recess formed on the inner face of the gasket and cemented thereto. In another form the reinforcing plate is merely cemented to the inner face of the gasket at one end and spans the joint between the gasket ends.

It is evident that with such a reinforcement or supporting member included in the gasket assembly, definite assurance is had that the gasket at the joint between its meeting ends will not fall down or collapse into a break in the pipe which is to be repaired.

Various other more detailed objects and advantages of the invention such as arise in connection with carrying out the above noted ideas in a practical embodiment will in part become apparent and in part be hereinafter stated as the description of the invention proceeds.

The invention therefore comprises a pipe repair clamp including a gasket carrying a reinforcing or supporting member on its inner face at the joint between the meeting ends of the gasket.

For a full and more complete understanding of the invention reference may be had to the following description and accompanying drawings, wherein.

Figure 2:
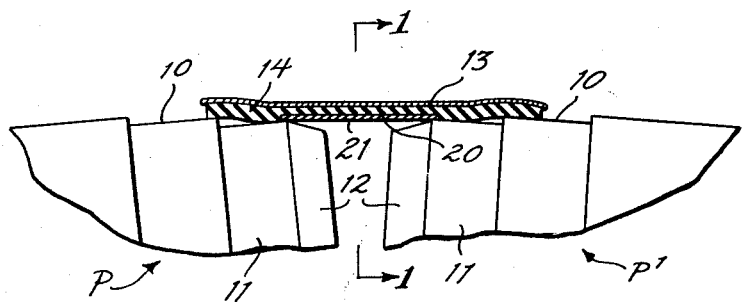
FIGURE 2 is a fragmentary view partly in section and partly in elevation illustrating how the gasket is supported in the space between meeting pipe ends.

Referring now to the drawings wherein like reference characters denote corresponding parts and first more particularly to FIGURE 2, a pair of pipe ends designated P and P' are therein illustrated. Pipes of this type are now commonly manufactured from cement and asbestos and a characteristic feature is the stepped end construction illustrated. Thus, each of the pipe ends is shown as having cylindrical sections 10 and 11 of reduced diameter and terminating in a conical end 12. It is evident that with any space between the end sections 12 or even with these ends abutting there would still be an area beneath the gasket of a repair clamp which is applied thereto which would be unsupported.

Figure 1:
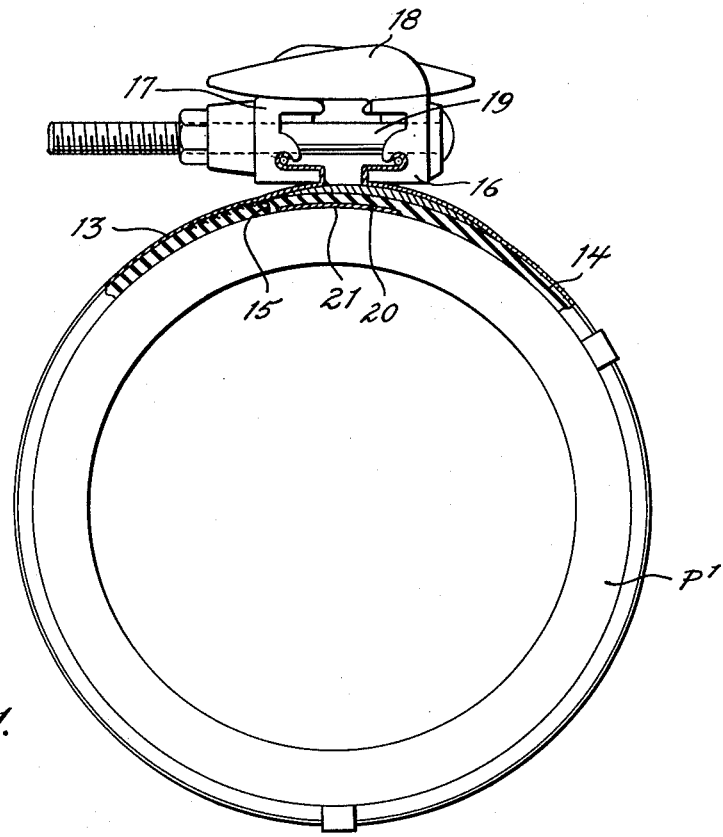
FIGURE 1 is a view in end elevation of a pipe having a repair clamp designed in accordance with the precepts of this invention applied thereto. In this view a portion of the band and gasket is broken away and shown in section.

Referring now more particularly to FIGURE 1, the end of the pipe P' is shown in elevation. A pipe repair clamp is shown as comprising a flexible metallic band 13 which carries a gasket 14 the ends of which meet at butt joint designated 15. In accordance with the practice fully explained in the above identified application the gasket 14 is bonded to the inner face of the band 13 throughout only a small portion of the engaging areas. This is to permit of relative movement between the major portion of the gasket and the band which feature is tied up with the butt joint 15 and enabling the band to accommodate a wide range of pipe sizes.

One end of the band 13 is anchored to a lug or side bar 16 in a well known manner while the other end of the band is secured to a similar lug or side bar 17. Each of the lugs 16 or 17 carry torque arms 18 which slide on bearing surfaces on the other of the lugs to prevent lug rolling. Bolts 19 carrying nuts 20 serve to draw the lugs 16 and 17 together and thus tighten the band 13 and gasket 14 carried thereby about the pipe P'.

Figure 3:
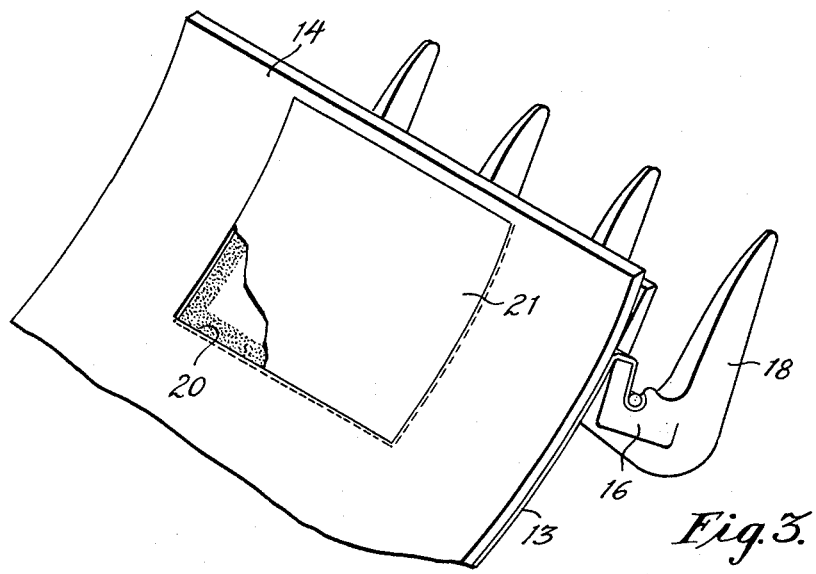
FIGURE 3 is a detailed perspective of one end of the band and gasket depicting the manner in which the support is secured thereto.

Referring now more particularly to FIGURE 3 the gasket 14 which is made of rubber, rubber composition or a comparable elastomer material is shown as formed with a shallow recess 20 at its inner face. Embedded in this recess 20 and cemented in place is a reinforcing or supporting plate 21 which is curved to conform to the curvature of the pipe to be repaired. This supporting plate 21 may be of any material having the required properties of strength and rigidity although the invention has particularly in mind the use of a thin sheet metal plate such as copper or stainless steel.

It is evident that with the supporting plate 20 located close to the joint 15, the gasket is supported and prevented from falling down into a break or the space between meeting pipe ends.

Figure 4:
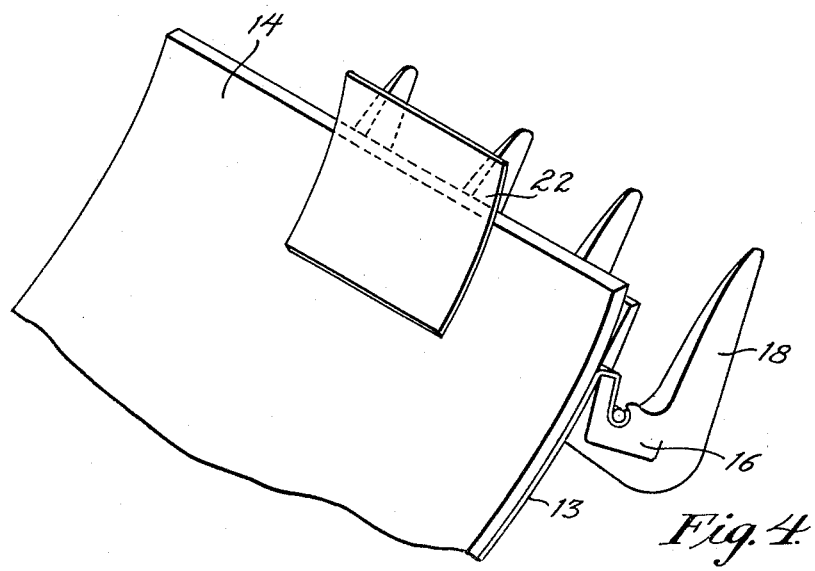
FIGURE 4 is a view similar to FIGURE 3 of a modification.

Referring now more particularly to FIGURE 4, a slightly modified form of the invention is therein illustrated. In this form a supporting plate 22 is merely cemented to the inner face of the gasket adjacent one end thereof and projects beyond that end so as to span the joint at the meeting ends. With this arrangement both ends of the gasket are adequately supported.

In describing the invention, reference has been made to securing the supporting plate in position by the use of cement. Obviously other securing means such as vulcanization or mechanical attachments could be employed.

While preferred specific embodiments of the invention are hereinbefore set forth it is to be clearly understood that the invention is not to be limited to the exact constructions, mechanisms and devices illustrated and described because various modifications of these details could be provided in putting the invention into practice within the purview of the appended claim.

What is claimed is:

In a pipe repair clamp including a flexible metallic band having spaced free end edges, a lug assembly carried by said band at each free edge, bolts for drawing said lug assemblies together to tighten said band about a pipe to be repaired, a gasket carried by said band on the inner face thereof and substantially coextensive therewith, said gasket being bonded to said band over an area less than half the engaging surfaces the remainder of said gasket being moveable relative to said band, said gasket having edges meeting in a butt joint, the improvement consisting of a support carried by said gasket on its inner face at said meeting edges and spanning the space between the meeting edges of said gasket.

References Cited in the file of this patent

UNITED STATES PATENTS

| | | |
|---|---|---|
| 158,554 | Whitcomb | Jan. 5, 1875 |
| 852,997 | Brandram | May 7, 1907 |
| 1,027,155 | Robbins | May 21, 1912 |
| 2,690,193 | Smith | Sept. 28, 1954 |
| 2,826,799 | Schustack | Mar. 18, 1958 |